United States Patent [19]

Naito

[11] Patent Number: 4,585,380

[45] Date of Patent: Apr. 29, 1986

[54] TOOL ATTACHING DEVICE IN A MACHINE TOOL

[75] Inventor: Tsutomu Naito, Aichi, Japan

[73] Assignee: NT Tool Kabushikikaisha, Japan

[21] Appl. No.: 607,102

[22] Filed: May 3, 1984

[30] Foreign Application Priority Data

May 18, 1983 [JP] Japan .................................. 58-87268

[51] Int. Cl.⁴ ......................... B23B 31/10; B23C 7/00
[52] U.S. Cl. ..................................... 409/234; 279/1 B
[58] Field of Search ............ 279/1 A, 1 B, 1 T, 1 TS, 279/103, 89, 90, 47, 52; 408/239 R, 239 A; 409/232, 239

[56] References Cited

U.S. PATENT DOCUMENTS

| | | | |
|---|---|---|---|
| 2,611,621 | 9/1952 | Patterson et al. | 279/1 B |
| 3,052,999 | 9/1962 | Sedgwick et al. | 279/1 TS |
| 3,975,984 | 8/1976 | Simmons | 279/103 X |
| 4,274,774 | 6/1981 | Haga et al. | 279/1 A X |

Primary Examiner—Eugene F. Desmond
Attorney, Agent, or Firm—William A. Drucker

[57] ABSTRACT

A device for attaching a tool to a machine tool is disclosed. A cylindrical hollow portion is provided in a spindle of the machine tool, and a gripper having locking elements is provided at a deep portion thereof. On the other hand, a tool is attached in advance to an installing and removing member which can be inserted into the hollow portion of the spindle. A connecting body having an engaging body is provided at the extremity of the installing and removing member. The installing and removing member to which the tool is attached in advance is inserted into the hollow portion of the spindle and the installing and removing member is rotated through a predetermined angle whereby the engaging body comes into engagement with the locking body to lock the tool to the spindle.

3 Claims, 23 Drawing Figures

ABSTRACT TEXT FOLLOWS.

TOOL ATTACHING DEVICE IN A MACHINE TOOL

BACKGROUND OF THE INVENTION

1. Field of the Invention

This invention relates, in machine tools such as a drilling exclusive-use machine, transfer machine, a multiple spindle drill head, a drilling machine and the like, to a device for attaching a tool such as a drill, a reamer or the like to a spindle thereof.

2. Description of the Prior Art

Drill chucks are well-known as such a device. A drill chuck can firmly attach a tool such as a drill to the spindle of the machine tool. The tool secured to the spindle by the drill chuck is rotated as the spindle rotates to machine work. As is well known, however, where drill chucks are used, it takes time to install and remove the tool.

The following device is known as a device with which one can save the time to attach and detach the tool and attach the tool to the spindle simply and speedily. Namely, the spindle is formed to have a hollow portion. In the hollow portion, a collet is provided and a drawbar is connected to the rear side of the collet. In attaching the tool, the base portion of the tool is inserted into the hollow portion from the opening end of the spindle. The base portion of the tool is firmly caught by the collet when the drawbar is pulled from behind the collet. However, with such device, it is very troublesome for an operator to go behind the spindle each time and pull the drawbar there. When the spindle is vertically disposed, it is additionally troublesome that the operator must rise to a high place in order to pull the drawbar.

Figure 22:
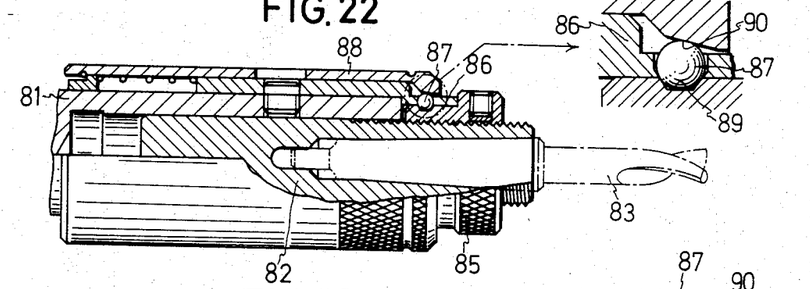
FIG. 22 is a partly sectional view showing a conventional attaching device.
Figure 23:
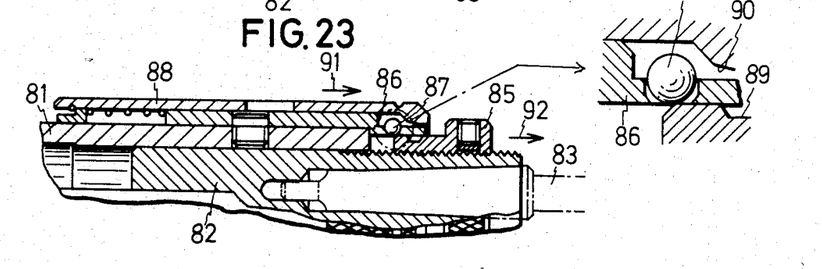
FIG. 23 is a partial view showing the operation of the device shown in FIG. 22.

In order to eliminate these troublesome points, a device as shown in FIGS. 22 and 23 has been proposed with which one can attach and detach the tool by an operation only at one side of the spindle. In the device shown in these figures, an installing and removing member 82 is adapted to be removable from a spindle 81. A tool 83 is attached to the installing and removing member 82. A connecting member 85 is mounted externally of the installing and removing member 82. A ball holder 86 mounted on a spindle 81 holds steel balls 87. An operating cylinder 88 provided on the outer preipheral side of the ball holder 86 is movable in an axial direction. In the state shown in FIG. 22, a locking surface 90 formed on the operating cylinder 88 is provided to prevent levitation of the steel ball 87 fitted in an engaging recess 89 of the connecting member 85. Thus, the installing and removing member 82 is not slipped out of the spindle 81. On the other hand, when the operating cylinder 88 is moved in a direction as indicated by arrow 91 as shown in FIG. 23, the steel ball 87 is freely levitated. Thus, the installing and removing member 82 together with the connecting member 85 may be taken out in a direction as indicated by arrow 92. Work for attaching the thus taken out installing and removing member 82 to the spindle 81 again may be easily accomplished in the state wherein the operating cylinder 88 is moved as shown in FIG. 23.

However, in the above-described device, since the steel ball is merely fitted in the engaging recess 89, the installing and removing member 82 can be moved axially, though slightly, with respect to the spindle 81. Because of this, where the tool 83 is rotated by the spindle 81 to machine work, the tool 83 is finely vibrated axially by a force applied by the work to the tool 83. Such fine vibration lowers the accuracy of finishing relative to the work and deteriorates finishing of the work.

SUMMARY OF THE INVENTION

It is therefore an object of the present invention to provide a tool attaching device in which a tool can be attached to a spindle, the spindle is rotated under the attached state to rotate the tool and work may be machined by the tool.

It is a further object of the present invention to provide a tool attaching device in which the tool can be attached and removed easily and speedily on the spindle.

According to the device of the present invention, the tool can be attached to the spindle by a simple operation which merely requires pushing an installing and removing member mounted on the tool in advance into the spindle and thereafter rotating the installing and removing member with respect to the spindle.

On the other hand, to remove the tool from the spindle, the tool can be removed by a simple operation which merely requires rotating the installing and removing member with respect to the spindle and thereafter pulling the installing and removing member out of the spindle.

Still another object of the present invention is to provide a tool attaching device with which the tool can be attached to and detached from the spindle by an operation only at one axial end of spindle.

Namely, according to the device of the present invention, the installing and removing member can be attached to or detached from the spindle in the above mentioned manner. Therefore the attaching and detaching operation can easily be carried out only at one side of the spindle (without forcing an operator to go behind the spindle each time).

It is another object of the present invention to provide a tool attaching device in which even though the tool can be installed and removed easily and speedily from the spindle, where work is machined by the tool attached to the spindle, attaching of the tool to the spindle can be maintained in a firm state without any play.

That is, in the device according to the present invention, a force for pulling the installing and removing member towards the spindle always exerts thereon under the above-described attached state. Therefore, a state is maintained wherein an abutting surface of the installing and removing member abuts on a receiving surface of the spindle. Thus, even if a force for pushing the tool towards the spindle is applied to the tool, movement of the tool in said direction can be prevented.

On the other hand, if a force for pulling out the tool in a direction opposite to the first-mentioned direction is applied thereto, movement of the tool in the foresaid pulling-out direction can be prevented by the force for pulling the installing and removing member towards the spindle as described above. Moreover, where a more powerful pulling-out force is exerted on the tool, resilient movement of the locking body for applying the pulling force, as described above, to the installing and removing member is mechanically stopped. As a consequence, movement of the tool in the above-described powerful pulling-out direction can be prevented.

In this manner, the tool is prevented from its substantial movement in either pushing-in direction or pulling-out direction. As a result, the fine vibration of the tool during the machining can be prevented, the accuracy of finishing with respect to the work is increased, and the finished appearance of the work appears beautifully.

Other objects and advantages of the invention will become apparent during the following discussion of the accompanying drawings.

DESCRIPTION OF THE PREFERRED EMBODIMENTS

In a tool attaching device shown in FIG. 1 through FIG. 16, a spindle 10 is rotatably mounted on a frame 11 of the machine tool by means of bearings 12. This spindle 10 is rotated in a known manner by means of a driving device not shown. The spindle 10 has a hollow portion 13 one end of which is open. The spindle 10 further has an annular receiving surface 15 in the circumference of the opening of the hollow portion 13. The receiving surface 15 is partly formed with two fitting recesses 16, 16. The hollow portion 13 is provided at its deep portion with a gripper 18. This gripper 18 is secured to the spindle 10 by a connector 19. The connector 19 has a threaded portion 21 which is threadedly engaged with a threaded hole 20, and a washer 23 is interposed between a flange 22 and the spindle 10. A disc-like base 25 in the gripper 18 is placed over the flange 22 through a spacer 31. The base 25 is secured to the connector 19 by means of a locking screw 29 and a washer 30. The gripper 18 has two arms 26, 26 formed integral with the base 25. These arms 26, 26 are opposed each other with a center axis of the spindle 10 sandwiched therebetween. These arms 26, 26 are further opposed in spaced relation through a small clearance (for example, 0.15 to 0.25 mm) relative to a peripheral wall surface 14 of the hollow portion 13. At the extremity of each of the arms 26 is provided a locking element 27 projected towards the aforesaid center axis. A locking surface 28 formed on the locking element 27 is in the form of a inwardly-directed tapered surface directed towards the deep portion of the hollow portion 13. An angle of inclination thereof is selected to be in the range, for example, from 30° to 60°.

Figure 3:
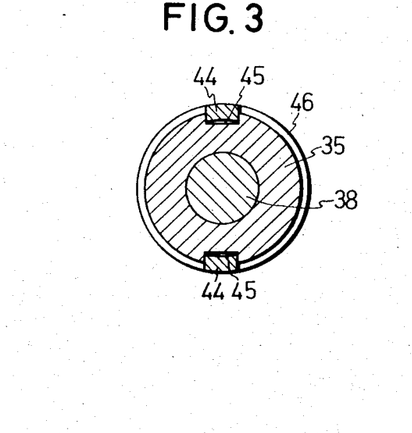
FIG. 3 is a sectional view taken on line III—III of FIG. 1.
Figure 4:
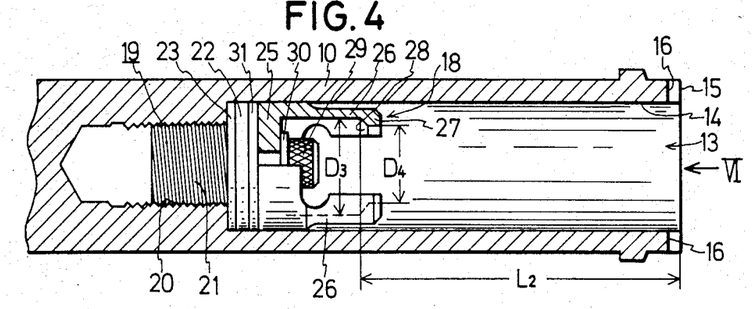
FIG. 4 is a sectional view of a spindle and a gripper mounted interiorly thereof.
Figure 5:
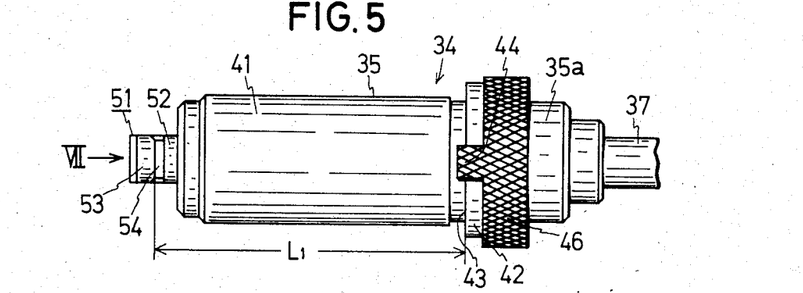
FIG. 5 is a front view of an installing and removing member.

The tool attaching device further has an installing and removing member 34. A body 35 of the installing and removing member 34 is interiorly provided with a tool mounting portion 36. This mounting portion 36 is formed in the form of a taper and a tapered portion 38 of the tool 37 is pressed therein to thereby render attachment of the tool possible. The mounting portion 36 is formed at the deep portion with an engaging portion 39 with which a tongue 40 of the tool 37 engages. An insert portion 41 of the body 35 has a dimension so that the former may be inserted into the hollow portion 13 without a play. The body 35 has a flange 42, one side of which comprises an abutting surface 43 in contact with the receiving surface 15. The installing and removing member 34 has a fitting piece 44. This fitting piece 44 is positioned within a groove 45 formed in the flange 42 as shown in FIG. 3 and is movable in a lateral direction in FIG. 5. An operating ring 46 provided in the periphery of the body 35 is movable in a direction of an axis of the body 35. The fitting piece 44 is formed integral with the operating ring 46. A spring 48 is interposed between a spring seat 47 mounted on the body 35 and the ring 46, and the operating ring 46 is biased to the left as viewed in FIGS. 1 and 5 by means of the spring 48. Next, a connecting body 51 provided at the extremity of the insert portion 41 has a projected portion 52 projected from the extremity of the insert portion 41. This projected portion 52 has a dimension such that the former may pass through between a pair of opposed locking elements 27, 27 in the gripper 18.

Figure 7:
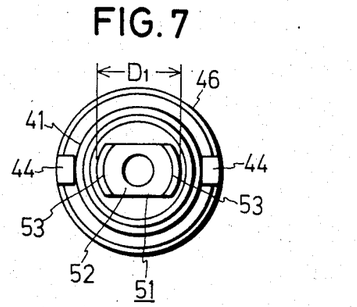
FIG. 7 is a view of the installing and removing member of FIG. 5 as viewed in a direction and indicated by arrow VII.

Engaging bodies 53, 53 are respectively radially projected from both sides of the extremity of the projected portion 52. The distance from the extremity of one engaging body 53 to the extremity of the other engaging body 53, that is, the distance $D_1$ shown in FIG. 7 is larger than the dimension $D_2$ of a clearance formed between the pair of locking elements 27, 27 and is smaller than the dimension $D_3$ of a clearance formed between the arms 26, 26. An engaging surface 54 of the engaging body 53 is formed into an outwardly-directed tapered surface directed towards the side of the insert portion 41. An angle of inclination thereof is selected in the range, for example, from 30° to 60°. In the engaging body 53, an engaging surface 54 is formed at the edge with a guide surface 55 as clearly shown in FIG. 15 or FIG. 16. These guide surfaces 55 are in the form of a surface inclined with respect to the circumferential direction of the engaging surface 54.

Next, the method of using the tool attaching device constructed as described above will be explained.

Figure 6:
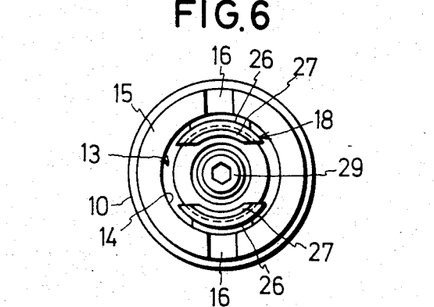
FIG. 6 is a view of the spindle and the gripper as viewed in a direction as indicated by arrow VI.

First, the hollow portion 13 is formed in the spindle 10 and is formed at the deep portion thereof with the mounting threaded hole 20. Next, the connector 19 is mounted in the deep portion of the hollow portion 13 making use of the threaded portion 21. Thereafter, the base 25 of the gripper 18 is placed over the flange 22 through the spacer 31, and the base 25 is mounted on the connector 19 using the locking screw 29 and washer 30. In this case, the relation between the locking elements 27, 27 in the gripper and the fitting recesses 16, 16 in the spindle 10 is made in the state as shown in FIG. 6. Also, in case of said mounting, the dimension $L_2$ from the receiving surface 15 to the locking surface 28 is made to be larger slightly, for example, about 0.05 to 0.15 mm, than the distance $L_1$ from the abutting surface 43 to the engaging surface 54 in the installing and removing member 34. Such an adjustment is accomplished by adjusting a thickness of the spacer 31.

Figure 8:
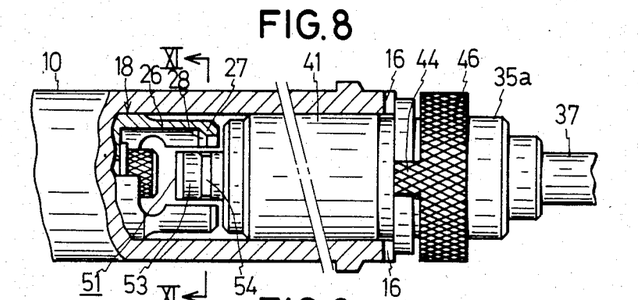
FIGS. 8 through 10 are sectional views showing the steps of attaching.
Figure 9:
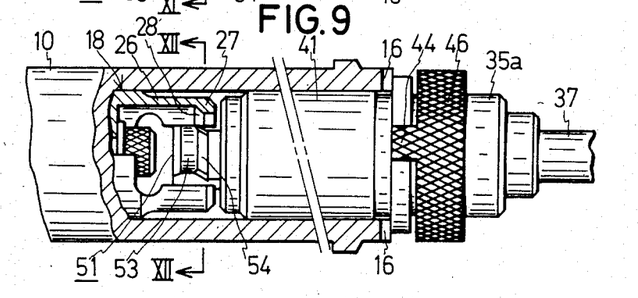
Figure 10:
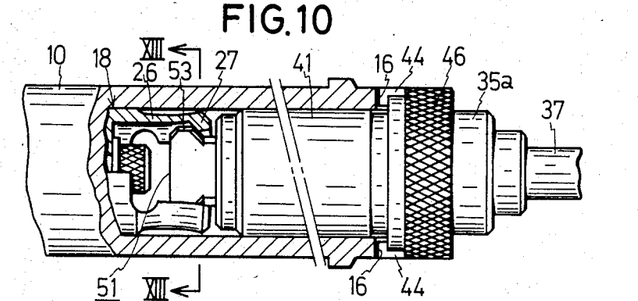
Figure 11:
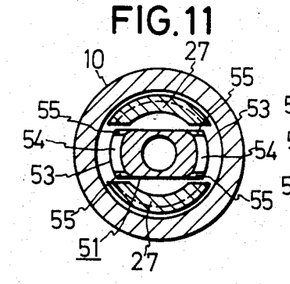
FIGS. 11 through 13 are sectional views taken on line XI—XI, line XII—XII, and XIII—XIII of FIG. 8, FIG. 9 and FIG. 10, respectively.
Figure 12:
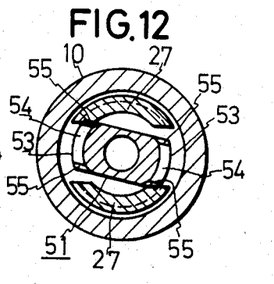
Figure 13:
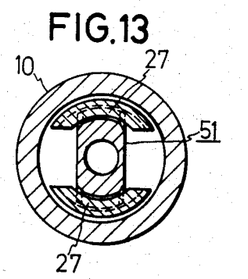

Next, in attaching the tool 37 to the spindle 10, work is accomplished in the following manner. First, the tool 37 is mounted on the installing and removing member 34. Then, as shown in FIGS. 8 and 11, the insert portion 41 of the installing and removing member 34 is inserted into the hollow portion 13 of the spindle 10. In this case, inserting is accomplished in a manner such that the engaging bodies 53, 53 in the connecting body 51 may pass through between the locking elements 27, 27 in the gripper 18. Then, the abutting surface 43 is placed in abutment with the receiving surface 15. The body 35 is rotated about 90° suitably to left or right while maintaining said abutted state. Then, via the state as shown in FIGS. 9 and 12, the locking elements 27, 27 are spread outwardly by the engaging body 53 as shown in FIGS. 10 and 13 so that the engaging surface 54 comes into engagement with the locking surface 28.

Figure 14:
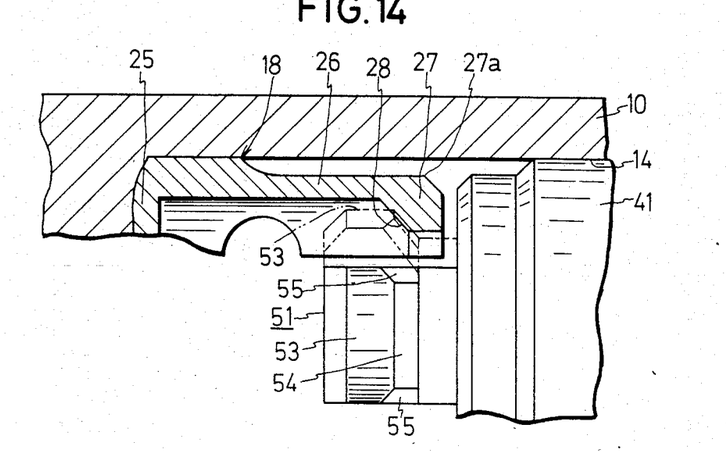
FIG. 14 is a partly enlarged view of FIG. 8.
Figure 15:
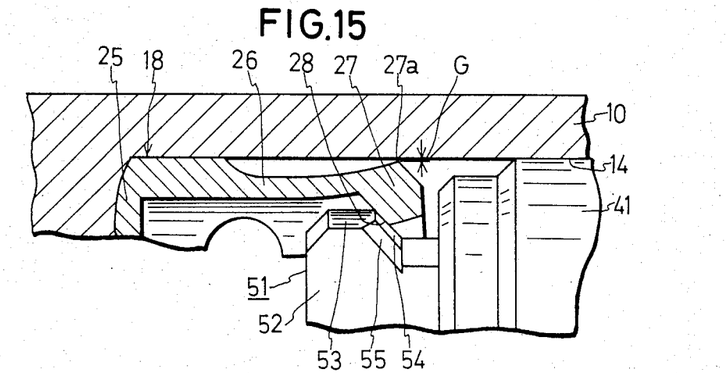
FIG. 15 is a partly enlarged view of FIG. 10.
Figure 16:
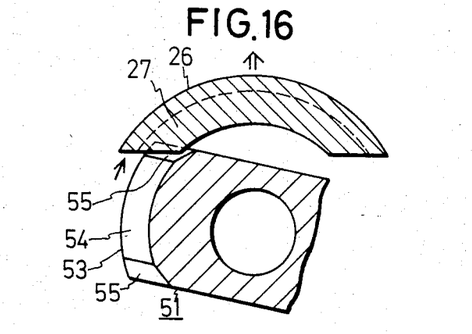
FIG. 16 is a partly enlarged view of FIG. 12.

This engaging step will be explained in detail with reference to FIGS. 14 through 16. In the state wherein the insert portion 41 is inserted into the hollow portion 13 as shown in FIG. 8, the engaging portion 53 is in a position as shown in FIG. 14. When the installing and removing member 34 is rotated from the aforesaid position, the engaging body 53 assumes a position as indicated by the phantom line in FIG. 14. However, since the arm 26 of the gripper 18 has a resiliency, the locking body 27 is spread outwardly by the engaging body 53 when the installing and removing member 34 is rotated as described above. As a result, the engaging surface 54 comes into engagement with the locking surface 28. It is noted that where the installing and removing member 34 is operated to be rotated, the locking element 27 is outwardly spread easily by the inclined guide surface 55. Thus, a small force required to rotate the installing and removing member 34 will suffice.

Figure 1:
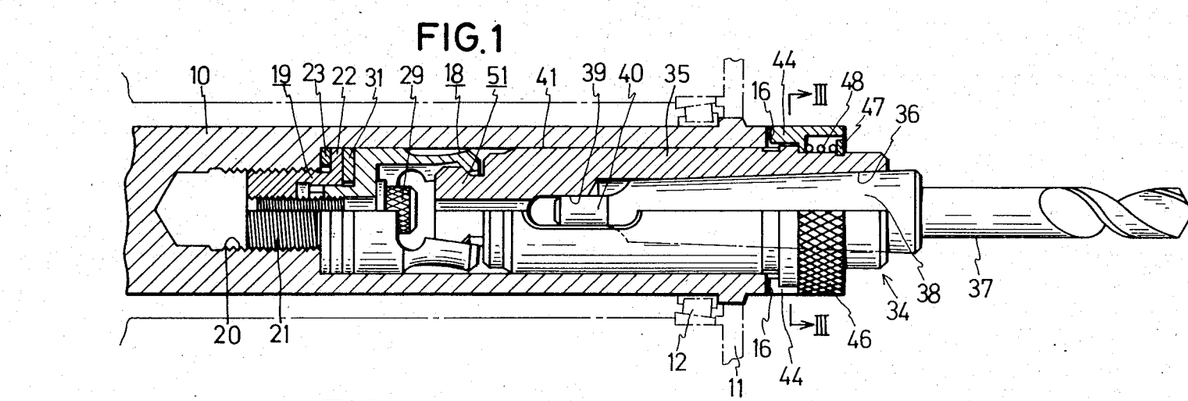
FIG. 1 is a sectional view of a tool attaching device.
Figure 2:
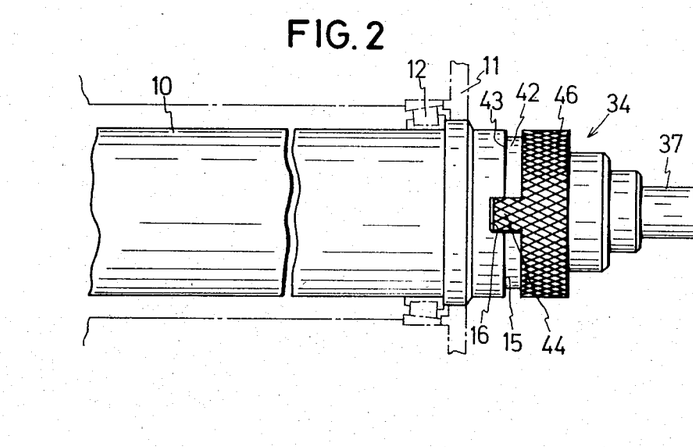
FIG. 2 is a partly omitted top view of FIG. 1.

In the state wherein the engaging surface 54 becomes engaged with the locking surface 28, the edge 27a of the locking element 27 is opposed in spaced relation with the peripheral wall surface 14 of the hollow portion 13 through an extremely small clearance G (for example, about 0.05 to 0.15 mm). When the installing and removing member 34 is rotated to bring the engaging surface 54 into engagement with the locking surface 28 as described above, a pair of engaging portions for preventing the installing and removing member 34 from being relatively rotated with respect to the spindle 10 engage each other. That is, the fitting piece 44 is fitted into the recess 16 by a biasing force of the spring 48 as shown in FIGS. 1, 2 and 10. Thereby, the relative rotation of the installing and removing member 34 with respect to the spindle 10 is prevented.

After the tool 37 has been attached to the spindle 10 in a manner as described above, the spindle 10 is rotated by the driving device and the work is machined by the tool 37. In this case, the locking element 27 always tends to return to its original state by the resiliency of the arm 26. For this reason, a biasing force towards the left as viewed in FIG. 1 exerts on the engaging body 53. That is, a force for pulling the insert portion 41 of the installing and removing member 34 towards and into the deep portion of the hollow portion 13 acts thereon. Thereby, the abutting surface 43 is maintained in close contact with the receiving surface 15. Accordingly, where the work is machined by the tool 37 as described above, even if the push-in force is applied to the tool 37, it will not be moved to the side of the spindle 10. Also, even if the force for pulling the tool 37 out of the spindle 10 is exerted from the work to the tool 37, the above-described closely contact state between the abutting surface 43 and the receiving surface 15 is maintained by said pull-in force. As a result, vibration of the tool 37 in a direction of an axis of the spindle 10 is prevented, and as a consequence, the work can be machined with high accuracy. The above mentioned point is further explained in detail. In the state where the installing and removing member 34 is mounted in the spindle 10, one side surface i.e., the abutting surface 43 of the flange 42 is provided on the periphery of the base portion of the insert portion 41 contacts pressingly with the receiving surface 15 near the opening of the spindle 10. On the other hand, the engaging surface 54 in the connecting body 51 provided on one extremity of the insert portion 41 engages with the locking surfaces 28 in the gripper 18 provided in the deep portion of the hollow portion in the spindle. In this case, since the distance $L_2$ from the receiving surface 15 to the locking surface 28 is further adjusted to be slightly larger than the distance $L_1$ from the abutting surface 43 to the engaging surface 54, the arms in the gripper are pushed and bent outwards in radial directions to establish the engagement of the engaging surface 54 with the locking surface 28. A restoring force due to the resiliency of the arms 26 consequently maintains the engagement between the locking surface 28 and the engaging surface 54. The restoring force moreover exerts a pull-in force on the insert portion 41 to attract it deep into the hollow portion 13. The pulling-in force maintains the pressingly contacting state of the abutting surface 43 to the receiving surface 15. The aforementioned axial playing movement of the installing and removing member relative to the spindle is prevented by these operations. The operations prevent also the transverse playing movement in a very effective manner even though a clearance is provided between the inner radius of the hollow portion 13 in the spindle 10 and the outer radius of insert portion 41 in the installing and removing member 34 in order to facilitate the insertion and detachment of the insert portion 41 against the hollow portion 13. Namely, since above mentioned engaging surfaces 54 and locking surfaces 28 are tapered, the transverse playing movement of the connecting body 51 is prevented by the engagement between these surfaces. Moreover, since the abutting surface 43 is kept in the pressing contact with the receiving surface 15, the transverse playing movement of the flange 42 is prevented by a friction force between both surfaces 43, 45. The prevention of the transverse playing movement of the installing and removing member 34 is therefore effectuated at distantly separated two places, i.e., at the gripper 18 and the receiving surface 15. The transverse playing movement of the installing and removing member is thus limited to a very small degree. Since the installing and removing member 34 is prevented from playing either in the axial or transverse direction in this manner, the minute swinging movement of the tool in these directions are largely reduced. Consequently, there is an advantage that the work can be machined with a high accuracy, the production of inferior machined goods is reduced and the nicking of the teeth of the tool is avoided as well as to prolong the expected life span of the tool. In the event that the pull-out force exerting on the tool 37 becomes more powerful (for example, 40 to 50 kg), at a portion where both the locking elements 27, 27 are spread through just a little, the edge 27a abuts against the inner wall surface 14 to prevent further spreading. Thus, at a portion where the tool 37 and the installing and removing member 34 are moved through just a little or not moved in a direction of the pull-out force, they are prevented from their movement in that direction. Where a difference between the dimensions $L_1$ and $L_2$ is about 0.05 mm, the distance through which the installing and removing member may be moved in said direction is about 0.2 mm and where said difference is about 0.15 mm, said distance is about 0.05 mm.

Next, where the installing and removing member 34 is removed from the spindle 10 to repair or replace the tool 37, operation will be accomplished as follows: First, the operating ring 46 is gripped by hand to pull out the fitting piece 44 from the fitting recess 16. Thereafter, the ring 46 is operated while gripping the same to rotate the installing and removing member 34 through about 90° suitably to left or right. Then, engagement of the engaging surface 54 with the locking surface 28 is released and the engaging body 53 is moved between the locking elements 27 and 27. Whereupon, the installing and removing member 34 can be removed from the hollow portion 13 of the spindle 10 while gripping the ring 46.

In the following, the positional relationship between the locking element 27 and the fitting recess 16 and the positional relationship between the engaging body 53 and the fitting piece 44 will be described.

When the engaging surface 54 of the engaging body 53 was placed in engagement with the locking surface 28 of the locking element 27, the fitting piece 44 can be fitted in the fitting recess 16.

Figure 17:
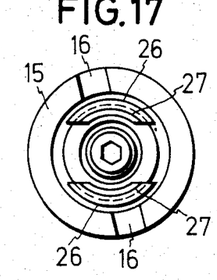
FIG. 17 is a view similar to FIG. 6 showing an example in which a position of a fitting recess is different.
Figure 18:
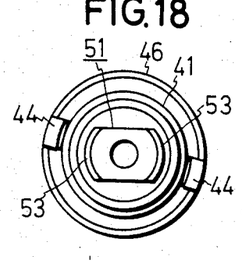
FIG. 18 is a view similar to FIG. 7 showing an example in which a position of a fitting piece is different.

For this purpose, the positional relationship between the locking element 27 and the fitting recess 16 can be set as shown in FIG. 17 whereas the positional relationship between the engaging body 53 and the fitting piece 44 can be set as shown in FIG. 18.

Figure 19:
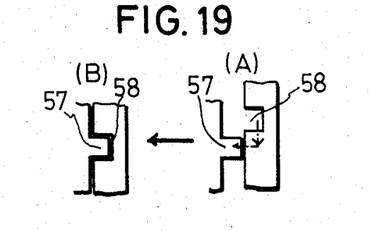
FIG. 19 is a partial view showing an example in which a relative rotation preventing engaging portion is different.

Next, a modified example of a pair of engaging portions for preventing relative rotation of the installing and removing member with respect to the spindle is shown in FIG. 19. In the FIG. 19 illustration, a projection 57 is provided on the side of the spindle and a recess 58 is provided on the side of the installing and removing member. Even in such an embodiment, when the member provided with the recess 58 is rotated from the position shown in FIG. 19 (A), the recess 58 is opposed to the projection 57 whereby both the elements come into engagement with each other as shown in FIG. 19 (B). As a consequence, it assumes a state that the relative rotation of the installing and removing member with respect to the spindle is prevented.

Figure 20:
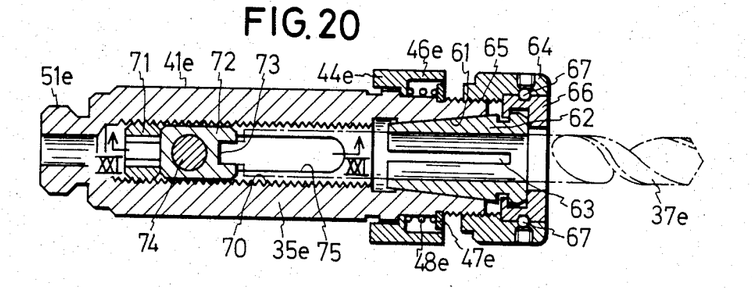
FIG. 20 is a sectional view showing an example in which construction of the installing and removing member is different.
Figure 21:
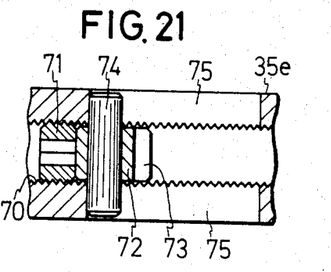
FIG. 21 is a sectional view taken on line XXI—XXI of FIG. 20.

An installing and removing member having a tool mounting portion different in construction from that of the previous one is shown in FIGS. 20 and 21. In these Figures, a tapered guide surface 61 is provided interiorly of a body 35e, and internally thereof there is provided a collet 62 having a groove 63. On the other hand, a fastening ring 64 provided in the outer peripheral side of the body 35e is threadedly engaged with a threaded portion 65 formed in the body 35e. The collet 62 and the fastening ring 64 are connected by a connecting ring 66 in such a way that movement of the fastening ring 64 in an axial direction is transmitted to the collet 62 but rotation of the ring 64 is not transmitted to the collet 62. On the other hand, an insert portion 41e in the body 35e is formed into a cylindrical configuration as shown, inner peripheral surface of which is formed with a position adjusting internal thread 70. A positioning member 71 is threadedly engaged with the internal thread 70. The body 35e is further internally provided with a retainer 72. This retainer 72 has an engaging recess 73 adapted to have a tongue 40e engaged, said tongue 40e being positioned at a root of a tool 37e. On the retainer 72 is mounted an engaging pin 74, one end and the other end of which are positioned at a guide groove 75 formed in the body 35e.

In attaching the tool 37e to the installing and removing member 34e constructed as described above, the root portion of the tool 37e is inserted into a hollow portion of the body 35e through the collet 62, and the tongue 40e is brought into engagement with the engaging recess 73. Thereafter, the fastening ring 64 is rotated to move the collet 62 to left as viewed in FIG. 20. Thereby, the collet 62 is guided by the guide surface 61 to reduce a diameter thereof to fasten and hold the tool 37e. Prior to performing such attachment, it is advisable that a dimension of length of the tool 37e projected from the installing and removing member 34e is set properly. That is, the positioning member 71 can be rotated to move the retainer 72 in a lateral direction as viewed in FIGS. 20 and 21 so that the latter may assume a proper position.

Parts contemplated to be the same as or equivalent to those shown in the preceding drawings in function have been designated by the same reference numerals as those used in the preceding drawings with an alphabet 'e' affixed thereto.

As many apparently widely different embodiments of this invention may be made without departing from the spirit and scope thereof, it is to be understood that the invention is not limited to the specific embodiments thereof except as defined in the appended claims.

What is claimed is:

1. A tool attaching device in a machine tool including:
   a rotatable spindle,
   an installing and removing member detachably mounted on said spindle,
   said spindle having a cylindrical hollow portion which is open to one end of the spindle, and a receiving surface provided in the periphery of an opening of said hollow portion and being directed in the same direction as a direction at which the hollow portion is open,
   a gripper provided at a deep portion of the hollow portion in said spindle,
   said gripper comprising a base secured to the spindle, two arms extended from the base towards the opening of the hollow portion and opposed with a center axis of the spindle sandwiched therebetween and locking elements projected from extremities of the arms towards said center axis, said arms being opposed in spaced relation through a slight clearance with a peripheral wall surface of said hollow portion, said arms being resiliently flexible towards the peripheral wall surface of the hollow portion, said locking elements respectively having locking surfaces directed towards the side of said base and inwardly inclined, said installing and removing member comprising a tool mounting portion for mounting the tool, an insert portion which can be inserted into said hollow portion, an abutting surface in abutment with said receiving surface in the state wherein the insert portion is inserted into the hollow portion, and a connecting body provided at the extremity of the insert portion, said connecting body having a projected portion projected from the extremity of said insert portion and having a diameter so that said projected portion may pass through and between the locking elements in said gripper, and engaging bodies respectively projected from both sides of the extremity of said projected portion, the distance between the extremities of said engaging bodies being larger than the distance between the extremities of the locking elements and smaller than the distance between inner surfaces of said arms, said engaging bodies respectively having engaging surfaces directed at the side of said insert portion and outwardly inclined, the distance from the receiving surface of said spindle to said locking surface being slightly larger than the distance from the abutting surface of said installing and removing member to said engaging surface so that the insert portion of said installing and removing member is inserted into the hollow portion of said spindle until said abutting surface abuts against said receiving surface whereby the extremity of the projected portion in the connecting body may pass through and between both the locking elements in the gripper, at which position the installing and removing member is rotated whereby the engaging body causes the locking element to be spread outwardly against the resiliency of said arms and the engaging surface comes into engagement with the locking surface, said one end in the spindle and such a portion in the installing and removing member that is located near said one end of the spindle when the insert portion is received in the hollow portion of the spindle being provided with a pair of engaging portions which are adapted to prevent the relative rotation of the installing and removing member with respect to the spindle but other than the gripper in the deep portion of the hollow portion and the connecting body provided at the extremity of the insert portion, and the relationship of the circumferential positions of respective engaging elements of said pair of engaging portions being determined in such a manner that the engaging elements engage with each other to prevent the rotation of the installing and removing member relative to the spindle when the installing and removing member is turned against the spindle until the engaging surface of the connecting body located at the extremity of the insert portion comes into engagement with the locking surface of the gripper located in the deep portion of the hollow portion.

2. A device according to claim 1 wherein out of the pair of engaging members provided on the spindle and on the installing and removing member, the engaging member provided on the spindle is a fitting recess formed in the form of a recess at a part of said receiving surface whereas the engaging member provided on the installing and removing member is a fitting piece provided movably in an axial direction with respect to the installing and removing member, said installing and removing member being provided with an axially movable operating ring provided in the periphery of the installing and removing member, said fitting piece being integral with the operating ring, said operating ring biasing the fitting piece in a direction where it is fitted in the fitting recess.

3. A device according to claim 1 wherein a connector is secured to a bottom of the hollow portion of said spindle, the base of said gripper being detachably mounted on said connector, and a spacer for adjusting the distance from said receiving surface to said locking surface is interposed between the connector and the base of the gripper.

* * * * *